(12) United States Patent
Wooley et al.

(10) Patent No.: US 7,753,521 B2
(45) Date of Patent: Jul. 13, 2010

(54) LENSES FOR THE CORRECTION OF PRESBYOPIA AND METHODS OF DESIGNING THE LENSES

(75) Inventors: C. Benjamin Wooley, Jacksonville, FL (US); James W. Haywood, Orange Park, FL (US); Ronald Clark, Jacksonville, FL (US); Thomas Karkkainen, Jacksonville, FL (US); Susan W. Neadle, Jacksonville, FL (US); Sheila B. Hickson-Curran, Ponte Vedra Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 187 days.

(21) Appl. No.: 12/058,817

(22) Filed: Mar. 31, 2008

(65) Prior Publication Data

US 2009/0244478 A1    Oct. 1, 2009

(51) Int. Cl.
    G02C 7/04    (2006.01)
    G02C 7/02    (2006.01)
(52) U.S. Cl. .................................... 351/161; 351/177
(58) Field of Classification Search ................ 351/161, 351/177
    See application file for complete search history.

(56) References Cited

U.S. PATENT DOCUMENTS

| 4,580,882 | A |   | 4/1986  | Nuchmann et al. |
|-----------|---|---|---------|-----------------|
| 4,861,152 | A |   | 8/1989  | Vinzia et al.   |
| 4,898,461 | A |   | 2/1990  | Portney         |
| 5,002,382 | A |   | 3/1991  | Seidner         |
| 5,024,517 | A |   | 6/1991  | Seidner         |
| 5,125,729 | A |   | 6/1992  | Mercure         |
| 5,166,711 | A |   | 11/1992 | Portney         |
| 5,181,053 | A |   | 1/1993  | Brown           |
| 5,225,858 | A |   | 7/1993  | Portney         |
| 5,270,744 | A |   | 12/1993 | Portney         |
| 5,278,592 | A |   | 1/1994  | Marie et al.    |
| 5,349,396 | A | * | 9/1994  | Roffman et al. ............. 351/161 |
| 5,443,507 | A |   | 8/1995  | Jacobi          |
| 5,448,312 | A |   | 9/1995  | Roffman et al.  |
| 5,485,228 | A |   | 1/1996  | Roffman et al.  |
| 5,517,260 | A |   | 5/1996  | Gladys et al.   |
| 5,521,656 | A |   | 5/1996  | Portney         |
| 5,526,071 | A |   | 6/1996  | Seidner         |

(Continued)

FOREIGN PATENT DOCUMENTS

DE    3246306 A1    6/1984

(Continued)

OTHER PUBLICATIONS

D.A. Hough, "Designing a New Range of Bifocal Contact Lenses", Optical World, Jun. 1991, p. 12, vol. 20, No. 140, Enfield, England.

(Continued)

*Primary Examiner*—Jordan M. Schwartz

(57) ABSTRACT

The invention provides methods for designing contact lenses and contact lenses designed according to the method, which lenses provide an improved method for presbyopia correction compared to conventional lenses and methods. It is a discovery of the invention that improved performance and reduced design time can be obtained by using lens pairs that act synergistically to provide the lens wearer with good binocularity and consistent performance in near, intermediate and distance vision.

10 Claims, 4 Drawing Sheets

U.S. PATENT DOCUMENTS

| | | | |
|---|---|---|---|
| 5,574,518 | A | 11/1996 | Mercure |
| 5,619,289 | A | 4/1997 | Seidner et al. |
| 5,652,638 | A | 7/1997 | Roffman et al. |
| 5,657,108 | A | 8/1997 | Portney |
| 5,682,223 | A | 10/1997 | Menezes et al. |
| 5,691,797 | A | 11/1997 | Seidner et al. |
| 5,715,031 | A | 2/1998 | Roffman et al. |
| 5,754,270 | A | 5/1998 | Rehse et al. |
| 5,796,462 | A | 8/1998 | Roffman et al. |
| 5,798,817 | A | 8/1998 | DeCarle |
| 5,805,260 | A | 9/1998 | Roffman et al. |
| 5,812,235 | A | 9/1998 | Seidner et al. |
| 5,812,236 | A | 9/1998 | Seidner et al. |
| 5,815,239 | A | 9/1998 | Chapman et al. |
| 5,835,187 | A | 11/1998 | Martin |
| 5,835,192 | A | 11/1998 | Roffman et al. |
| 5,847,802 | A | 12/1998 | Menezes et al. |
| 5,877,839 | A | 3/1999 | Portney |
| 5,898,473 | A | 4/1999 | Seidner et al. |
| 5,975,694 | A | 11/1999 | Vayntraub |
| 6,007,201 | A | 12/1999 | Wada et al. |
| 6,030,077 | A | 2/2000 | Sawano et al. |
| 6,116,735 | A | 9/2000 | Wada |
| 6,179,420 | B1 | 1/2001 | Roffman et al. |
| 6,186,625 | B1 | 2/2001 | Portney |
| 6,199,982 | B1 | 3/2001 | Oyama et al. |
| 6,244,709 | B1 | 6/2001 | Vayntraub et al. |
| 6,260,966 | B1 | 7/2001 | Sawano et al. |
| 6,357,876 | B1 | 3/2002 | Oyama et al. |
| 6,364,483 | B1 | 4/2002 | Grossinger et al. |
| 6,409,340 | B1 | 6/2002 | Portney |
| 6,428,573 | B2 | 8/2002 | Barnett |
| 6,457,826 | B1 | 10/2002 | Lett |
| 6,474,814 | B1 | 11/2002 | Griffin |
| 6,511,178 | B1 | 1/2003 | Roffman et al. |
| 6,527,389 | B2 | 3/2003 | Portney |
| 6,537,317 | B1 | 3/2003 | Steinert et al. |
| 6,547,822 | B1 | 4/2003 | Lang |
| 6,557,998 | B2 | 5/2003 | Portney |
| 6,576,011 | B2 | 6/2003 | Portney |
| 6,576,012 | B2 | 6/2003 | Lang |
| 6,582,076 | B1 | 6/2003 | Roffman et al. |
| 6,685,315 | B1 | 2/2004 | DeCarle |
| 6,709,102 | B2 | 3/2004 | Duppstadt |
| 6,733,125 | B2 | 5/2004 | Berube et al. |
| 6,802,606 | B2 | 10/2004 | Roffman et al. |
| 6,808,262 | B2 | 10/2004 | Chapoy et al. |
| 6,814,439 | B2 | 11/2004 | Portney |
| 6,824,563 | B2 | 11/2004 | Lang |
| 6,874,887 | B2 | 4/2005 | Tyson |
| 6,929,366 | B2 | 8/2005 | Perel et al. |
| 7,073,906 | B1 | 7/2006 | Portney |
| 7,261,412 | B2 | 8/2007 | Somani et al. |
| 7,503,652 | B2 * | 3/2009 | Menezes ............... 351/161 |
| 2001/0033363 | A1 | 10/2001 | Chateau et al. |
| 2002/0036748 | A1 | 3/2002 | Chapoy et al. |
| 2002/0143394 | A1 | 10/2002 | Lang |
| 2003/0045931 | A1 | 3/2003 | Lang |
| 2003/0123024 | A1 | 7/2003 | Dunn |
| 2004/0156014 | A1 | 8/2004 | Piers |
| 2004/0201821 | A1 | 10/2004 | Tyson |
| 2005/0041203 | A1 | 2/2005 | Lindacher et al. |
| 2007/0030444 | A1 | 2/2007 | Chauveau et al. |
| 2009/0059167 | A1 * | 3/2009 | Wooley et al. ............. 351/161 |

FOREIGN PATENT DOCUMENTS

| | | | |
|---|---|---|---|
| EP | 0225098 | A2 | 6/1987 |
| EP | 0803076 | B1 | 4/1999 |
| EP | 1070978 | B1 | 1/2001 |
| EP | 0741314 | B2 | 2/2005 |
| EP | 1055145 | B1 | 10/2005 |
| WO | WO 9222264 | A1 | 12/1992 |
| WO | WO 96/21878 | | 7/1996 |
| WO | WO 00/08516 | | 2/2000 |
| WO | WO 01/35880 | A1 | 5/2001 |
| WO | WO 01/53878 | A1 | 7/2001 |
| WO | WO 0184216 | A1 | 11/2001 |
| WO | WO 2005/001553 | A1 | 1/2005 |
| WO | WO 2005/040895 | A1 | 5/2005 |
| WO | WO 2006/053776 | A1 | 5/2006 |
| WO | WO 2006/056847 | A1 | 6/2006 |

OTHER PUBLICATIONS

George T. Bauer, "Longitudinal Spherical Aberration of Soft Contact Lenses", International Contact Lens Clinic, May/Jun. 1979, pp. 72-79.

PCT International Search Report . PCT/2009/038960 date of mailing Jul. 23, 2009.

* cited by examiner

LENSES FOR THE CORRECTION OF PRESBYOPIA AND METHODS OF DESIGNING THE LENSES

FIELD OF THE INVENTION

The invention relates to ophthalmic lenses useful for the correction of presbyopia. In particular, the invention provides sets of contact lenses from which pairs may be selected, and lens pairs, to be worn by an individual to correct presbyopia.

BACKGROUND OF THE INVENTION

As an individual ages, the eye is less able to accommodate, or bend the natural lens, to focus on objects that are relatively near to the observer. This condition is known as presbyopia. Similarly, for persons who have had their natural lens removed and an intraocular lens inserted as a replacement, the ability to accommodate is absent.

Among the methods used to correct for the eye's failure to accommodate is a method known as mono-vision in which a single vision lens for correction of distance vision is used in the lens wearer's dominant eye and a single vision lens for correction of near vision is used in the non-dominant eye. Monovision is disadvantageous because it results in a loss of stereopsis. Another known method for correction of presbyopia is to use bifocal or multifocal contact lenses in both of the individual's eyes. Use of bifocal or multifocal lenses in both eyes results in a reduction of image contrast and resolution compared to mono-vision. Yet another method of treating presbyopia is to place a bifocal or multifocal lens in one eye and a single vision lens in the other eye. The disadvantage in using this method is in the large number of lenses that must be considered in order to provide the individual with satisfactory lens performance.

DETAILED DESCRIPTION OF THE INVENTION AND PREFERRED EMBODIMENTS

Figure 1:
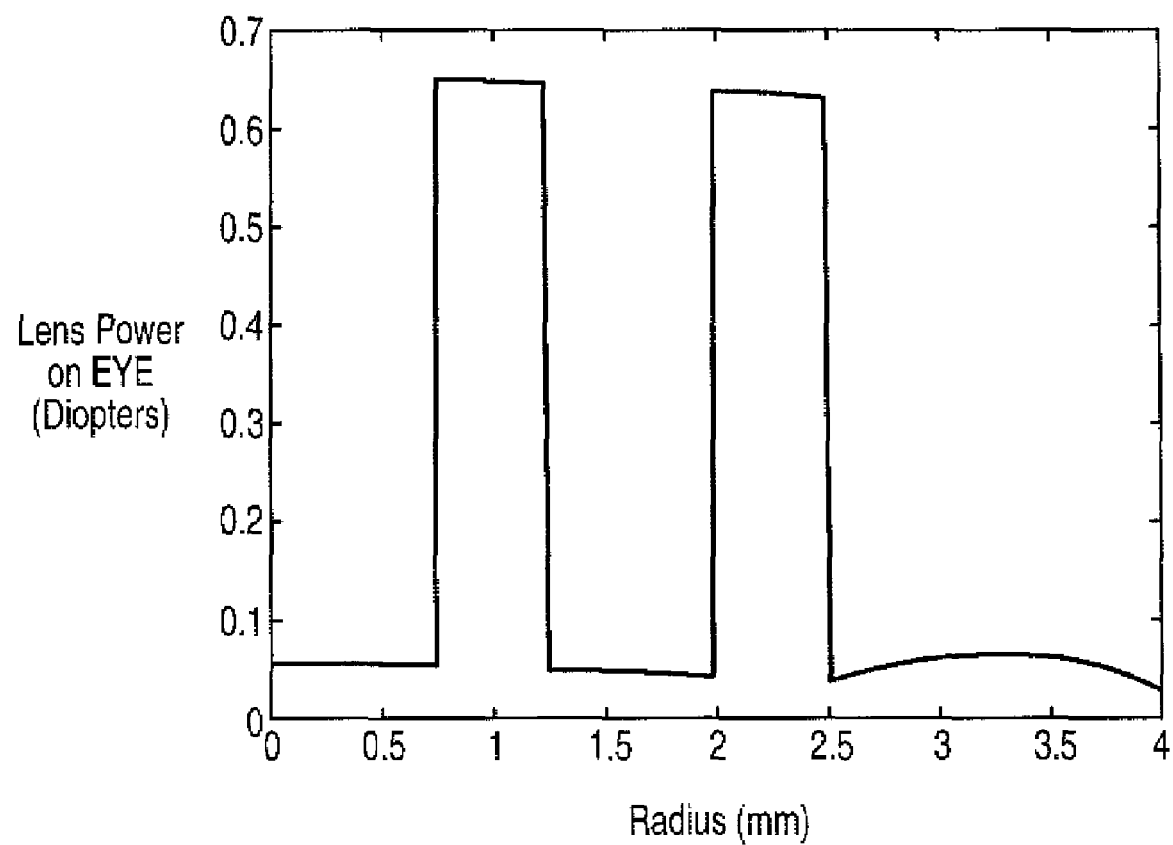
FIG. 1 is a graph in which is depicted a power profile.

The invention provides methods for designing contact lenses, contact lenses designed according to the method, and methods for producing the lens, which lenses provide an improved method for presbyopia correction compared to conventional lenses and methods. It is a discovery of the invention that improved performance and reduced design time can be obtained by using lens pairs that act synergistically to provide the lens wearer with good binocularity and consistent performance in near, intermediate and distance vision.

In one embodiment, the invention provides a lens pair, comprising, consisting essentially of, and consisting of a first lens and a second lens that satisfy the following relationships:

$\overline{D} \geq -0.14 \times Rx\_add + 0.84$ $\overline{N} \geq -0.08 \times Rx\_add + 0.64$ $\overline{\Delta d} \leq 0.2$ $\overline{\Delta n} \leq 0.2$ wherein $\overline{D}$ is a mean value of a binocular weighted distance ratio for pupil diameters from 2.5 to 6 mm;

Rx_add is the additional power in diopters added to the distance prescription to provide near vision correction for an individual;

$\overline{N}$ is a mean value of a binocular weighted near ratio for pupil diameters from 2.5 to 6 mm;

$\overline{\Delta d}$ is a mean value for a disparity at distance vision between the first and second lens for pupil diameters of about 2.5 to 6 mm; and $\overline{\Delta n}$ is a mean value for a disparity at near vision between the first and second lens for pupil diameters of about 3.5 to about 6 mm.

In a preferred embodiment, the lens pair is selected from a set of lenses having a range of add powers of from about 0.75 to about 2.50 diopters.

The invention also provides a method for correcting presbyopia comprising, consisting essentially of, and consisting of: a.) providing two or more lenses, each lens having a power profile different from that of each of the other lenses; and b.) selecting from the lenses provided in step a.) a first lens and a second lens to form a lens pair, wherein the first and second lens pair satisfy the following relationships:

$\overline{D} \geq -0.14 \times Rx\_add + 0.84$ $\overline{N} \geq -0.08 \times Rx\_add + 0.64$ $\overline{\Delta d} \leq 0.2$ $\overline{\Delta n} \leq 0.2$ In still another embodiment, the invention provides a set of lenses comprising, consisting essentially of, and consisting of a first lens having a mean value of a monocular weighted distance ratio $d_A$ and a mean value of a monocular weighted near ratio $n_A$, a second lens having a mean value of a monocular weighted distance ratio $d_B$ and a mean value of a monocular weighted near ratio $n_B$, and a third lens having a mean value of a monocular weighted distance ratio $d_C$ and a mean value of a monocular weighted near ratio $n_C$, wherein each of the first, second and third lenses have a power profile that is different from each of the other lenses and wherein $d_A > d_B > d_C$ and $n_A < n_B < n_C$. In a preferred embodiment, the set of lenses is a set of three lenses.

It is a discovery of the invention that superior performance, compared to conventional multifocal lenses, may be achieved by an individual wearing a pair of lenses that satisfy the following relationships:

$\overline{D} \geq -0.14 \times Rx\_add + 0.84$ $\overline{N} \geq -0.08 \times Rx\_add + 0.64$ $\overline{\Delta d} \leq 0.2$ $\overline{\Delta n} \leq 0.2$ wherein $\overline{D}$ is a mean value of a binocular weighted distance ratio for pupil diameters from 2.5 to 6 mm;

Rx_add is the additional power in diopters added to the distance prescription to provide near vision correction for an individual;

$\overline{N}$ is a mean value of a binocular weighted near ratio for pupil diameters from 2.5 to 6 mm;

$\overline{\Delta d}$ is a mean value for a disparity at distance vision between the lenses for pupil diameters of about 2.5 to 6 mm; and $\overline{\Delta n}$ is a mean value for a disparity at near vision between the lenses for pupil diameters of about 3.5 to about 6 mm.

The binocular weighted distance ratio ("D") is the maximum of the weighted distance ratio of the dominant eye ("$d_1$") and the weighted distance ratio of the non-dominant eye ("$d_2$") or D=max ($d_1$, $d_2$). The weighted near ratio ("N") is the maximum of the weighted near ratio of the dominant eye ("$n_1$") and the weighted near ratio of the non-dominant eye ("$n_2$") or N=max ($n_1$, $n_2$). For purposes of the invention, by "dominant eye" is meant the eye that is determined by the eye care practitioner to be the eye the correction for which should be optimized for distance vision and the non-dominant eye refers to eye the correction for which should be optimized for near vision.

The monocular weighted distance and near ratios may be calculated for various pupil sizes for each eye and are measures of how well the power at any given lens radius meets the distance and near requirements, respectively, of the lens wearer. The ratios also measure how well a single lens may be expected to perform relative to ideal given the wearer's sphere and add prescriptions. The weighted distance and near ratios will have a range of values from 0 to 1.0, with 0 meaning that no benefit is provided at the required distance for the lens wearer and 1.0 meaning that the lens fully corrects the wearer at the distance. For rotationally symmetric power profiles, the monocular weighted distance ratio may be calculated by integrating over the lens radius to give:

$$d(R) = \frac{\int_0^R [1 - \tanh(0.5 * |P(r) - Rx\_sphere|)] r \, dr}{\int_0^R r \, dr} \quad (I)$$

wherein R is a radius of the pupil;

Rx_sphere is a sphere prescription power in diopters for the eye that the monocular weighted ratio is being calculated;

tanh is the hyperbolic tangent; and

P(r) is the power of the lens plus eye given by the following equation:

$$P(r) = P_{CL}(r) + SA_{eye} * r^2 + F \quad (II)$$

wherein $SA_{eye}$ is the spherical aberration of the eye and preferably is 0.1 diopters/mm$^2$;

F is the lens fit, meaning the change from nominal, in diopters;

r is a radial distance from the center of the contact lens; and $P_{CL}(r)$ is the radial power distribution, or power profile, for the contact lens. For a specific design, the power distribution is provided as a series of $P_{CL}(r)$ in increments of 0.25 diopters.

The radial power distribution, or power profile, ($P_{CL}(r)$) of the lens is the axial power of the lens in air and may be calculated from the surface shapes, thickness and index of refraction of the lens. The radial power distribution may also be measured, most accurately, by measuring the wavefront with an interferometer from which the wavefront can be determined. FIG. 1 is an example of a radial power distribution, or power profile. As shown, the horizontal, or x, axis is the radial distance from the geometric center of the lens. The vertical, or y, axis is the lens power added to the eye power at each radial position.

The monocular weighted near ratio may be calculated by integrating over the lens radius to give:

$$n(R) = \frac{\int_0^R [1 - \tanh(0.5 * |P(r) - Rx\_sphere - Rx\_add|)] r \, dr}{\int_0^R r \, dr} \quad (III)$$

wherein R, is the radius of the pupil;

Rx_sphere is a sphere prescription power in diopters for the eye that the monocular weighted ratio is being calculated;

tanh is the hyperbolic tangent;

P(r) is the power of the contact lens plus eye given by Equation II; and

Rx_add is an additional power in diopters added to a distance prescription to provide near vision correction for the individual.

For non-rotationally symmetric power profiles, the monocular weighted distance ratio may be calculated by integrating over the lens radius to give:

$$d(R) = \frac{\int_0^{2\pi} \int_0^R [1 - \tanh(0.5 * |P(r, \Phi) - Rx\_sphere|)] r \, dr \, d\Phi}{\int_0^{2\pi} \int_0^R r \, dr \, d\Phi} \quad (IV)$$

wherein R, Rx_sphere, tanh and P(r) are as set forth above; and $\Phi$ is a polar angle.

The monocular weighted near ratio for non-rotationally symmetric power profiles may be calculated by integrating over the lens radius to give:

$$n(R) = \frac{\int_0^{2\pi} \int_0^R [1 - \tanh(0.5 * |P(r, \Phi) - Rx\_sphere - Rx\_add|)] r \, dr \, d\Phi}{\int_0^{2\pi} \int_0^R r \, dr \, d\Phi} \quad (V)$$

For symmetrical diffractive lenses, the monocular weighted distance ratio may be calculated by integrating over the lens radius to give:

$$d(R) = \frac{\int_0^R \left[1 - \tanh\left(0.5 * \left|\sum_m \varepsilon_m * P_m(r) - Rx\right|\right)\right] r\, dr}{\int_0^R r\, dr} \quad \text{(VI)}$$

wherein m is the diffractive order;

$P_m(r)$ is the power profile into order m;

$\varepsilon_m$ is the diffractive efficiency into order m; and $\sum_m \varepsilon_m$ is 1.

Equations II, IV and V may be similarly modified.

Using the binocular weighted distance ratio D and binocular weighted near ratio N, the best performance for a lens pair for correcting presbyopia may be obtained using lenses incorporating spherical aberration correction with the lens in the dominant eye fit to the prescription sphere power and the non-dominant eye lens fit to the sphere power plus the prescribed add power. In this case, D and N both equal 1.0. Although this pair provides optimum performance in individuals who can tolerate disparity between the eyes at distance and near, for those individuals who cannot tolerate the disparity, the measurement of the lenses' performance must be expanded to account for the disparity.

The disparity at distance, $\Delta d$, and at near, $\Delta n$, may be defined as:

$\Delta d = |d_1 - d_2|$ $\Delta n = |n_1 - n_2|$

The disparity measurements correlate with visual comfort, stereopsis, and visual artifacts.

Figure 2:
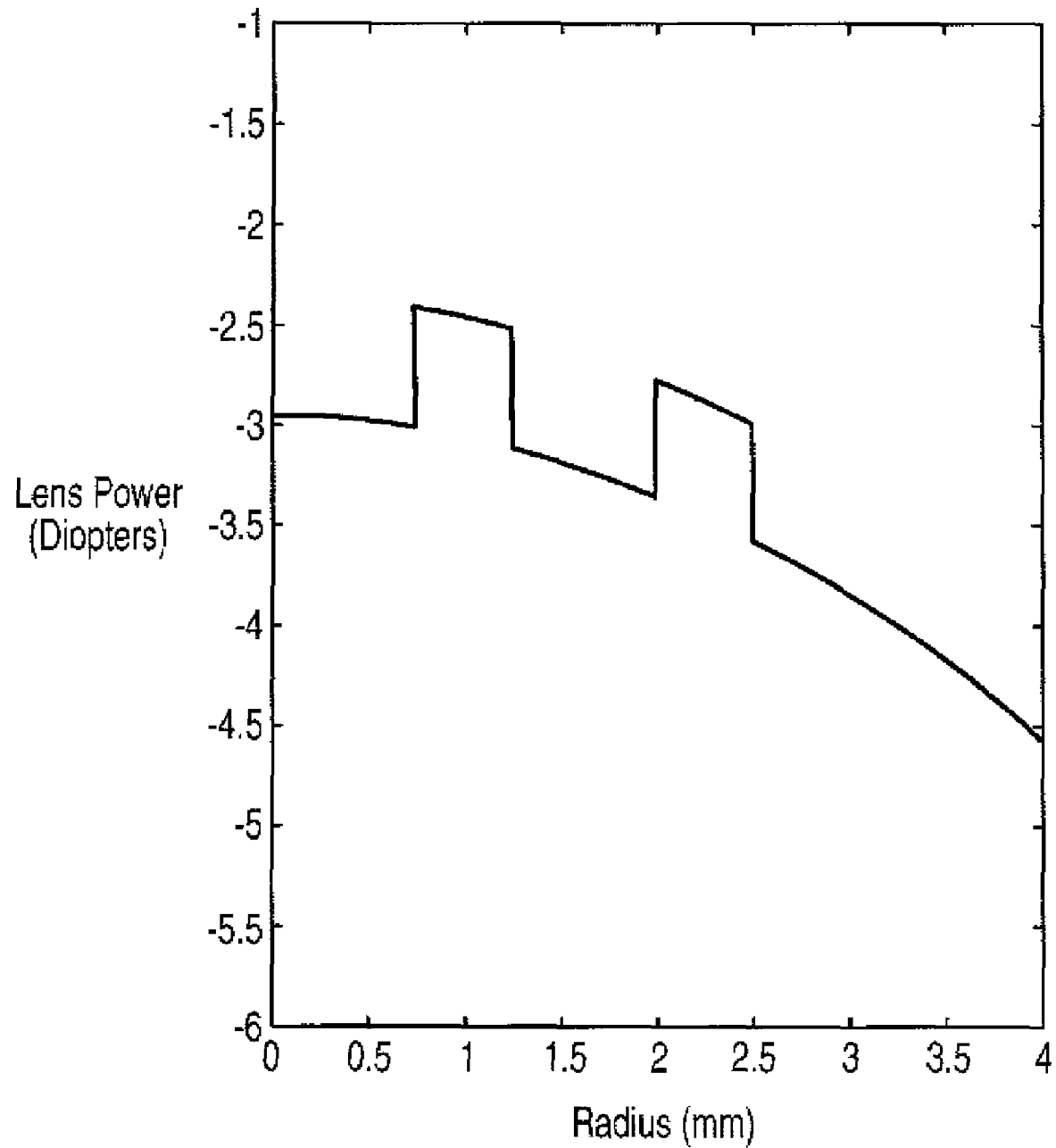
FIG. 2 is a graph in which is depicted a power profile of a lens of the invention.
Figure 3:
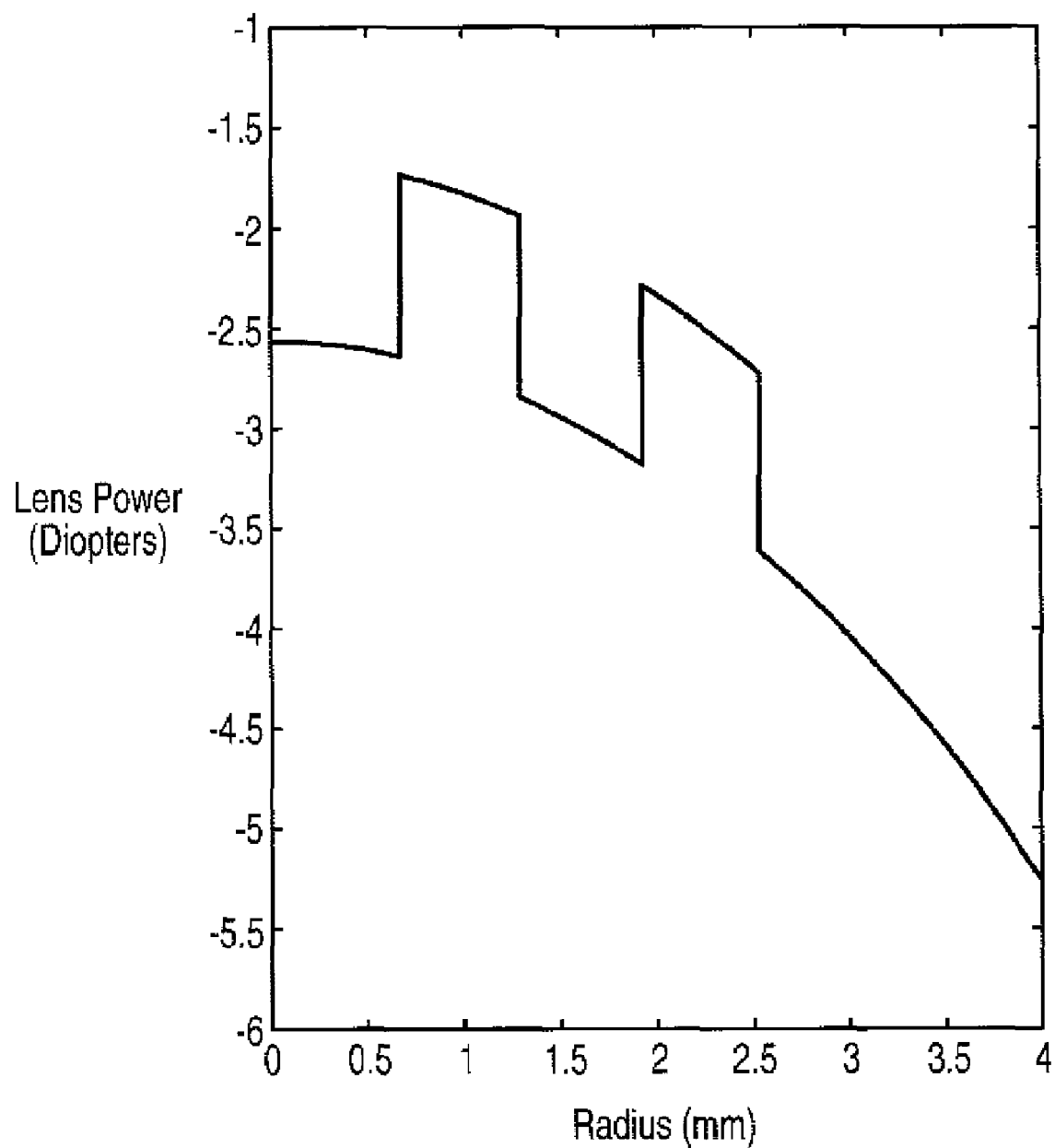
FIG. 3 is a graph in which is depicted a power profile of a lens of the invention.
Figure 4:
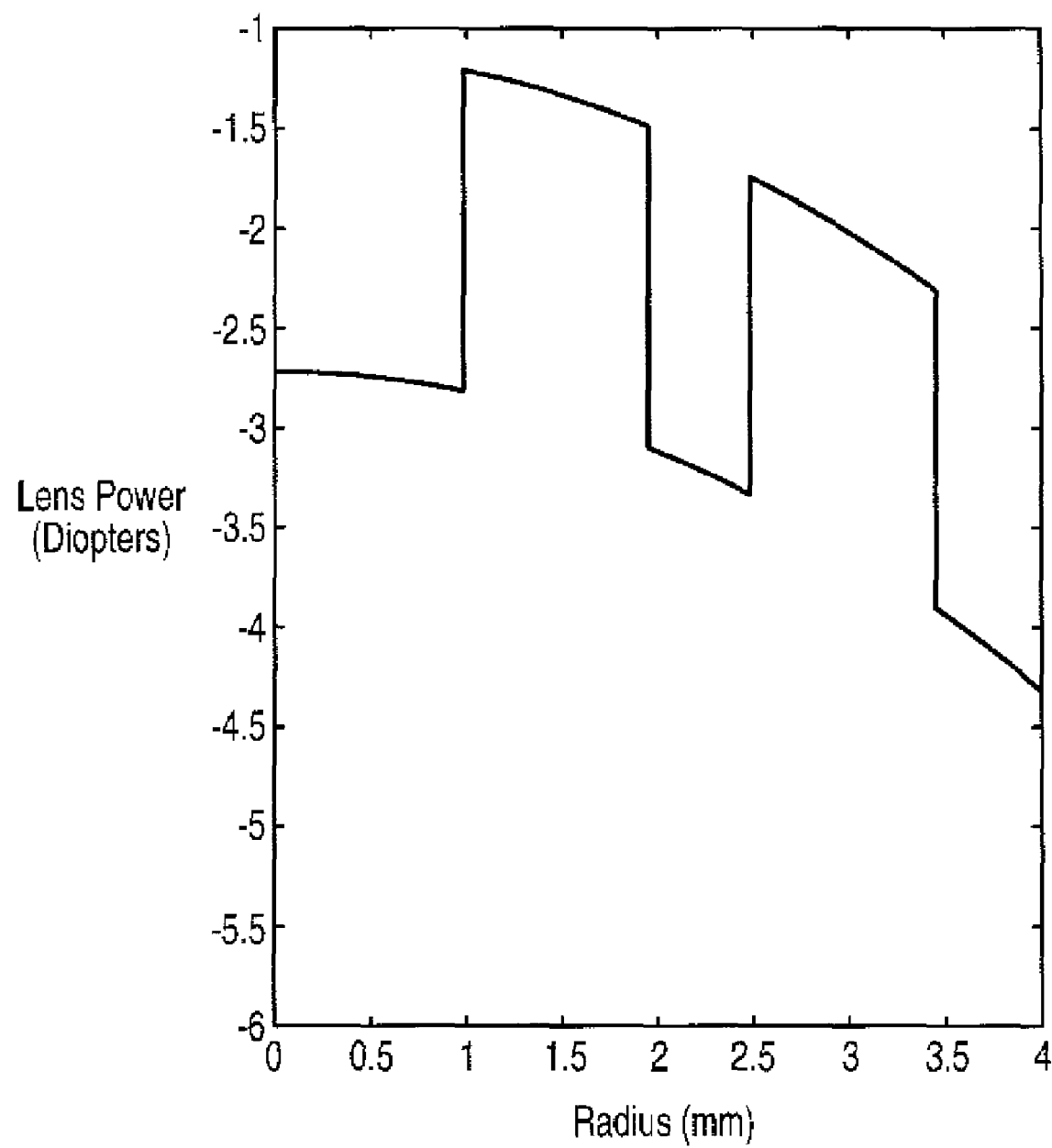
FIG. 4 is a graph in which is depicted a power profile of a lens of the invention.

In a preferred embodiment, a set of three lenses is provided, each lens having a power profile different from that of each of the other lenses and the lenses satisfying the following relationships:

$\overline{D} \geq -0.14 \times Rx\_add + 0.84$ $\overline{N} \geq -0.08 \times Rx\_add + 0.64$ $\overline{\Delta d} \leq 0.2$ $\overline{\Delta n} \leq 0.2$ For purposes of the invention, by "a set of three lenses" is not meant literally only three lenses, but rather three subsets of lenses each of which subsets is composed of multiple lenses that provide sphere power and add power over desired ranges. Preferably, each subset is composed of multiple lenses that provide sphere power over the range of −12.00 to +8.00 diopters in 0.50 diopters increments and add power over the ranges of 0.75 to 2.50 diopters in increments of 0.25 diopters. More preferably, one subset of lenses provides sphere power over the range of −12.00 to +8.00 diopters in 0.50 diopters increments and add power over the ranges of 0.75 to 1.75 diopters in increments of 0.25 diopters, a second subset of lenses provides sphere power over the range of −12.00 to +8.00 diopters in 0.50 diopters increments and add power over the ranges of 0.75 to 2.5o diopters in increments of 0.25 diopters, and a third subset of lenses provides sphere power over the range of −12.00 to +8.00 diopters in 0.50 diopters increments and add power over the ranges of 1.25 to 2.50 diopters in increments of 0.25 diopters, Examples of power profiles for a lens from each of the subsets for a −3.00 diopters sphere prescription are shown in FIGS. 2, 3, and 4. The lenses exemplified by these power profiles also satisfy $d_A > d_B > d_C$ and $n_A < n_B < n_C$. These exemplary lenses may be fit in the pair combinations shown on Table 1 below. For purposes of Table 1, the lens of FIGS. 2, 3, and 4 are designated "A", "B", and "C", respectively. In Table 1, the first letter denominates the lens used in the dominant eye and the second letter is the lens of the non-dominant eye. A "+" sign designates that the non-dominant eye lens is fit with an additional 0.25 diopters of power above that determined by the eye care practitioner as required for the best distance vision correction for the individual.

TABLE 1

| Add Power (diopters) | Combinations |
|---|---|
| 0.75 | AA, AB, AA+ |
| 1.00 | AA, AB, AA+ |
| 1.25 | BB, AB., BC, AA+, BB+ |
| 1.50 | BB, AB, BC, AA+, BB+ |
| 1.75 | BC, BB, AB |
| 2.00 | BC, BB+ |
| 2.25 | BC |
| 2.50 | BC |

Still more preferably, the invention provides a set of three lenses, each lens having a power profile different from that of each of the other lenses and the lenses satisfying the following relationships:

$\overline{D} \geq -0.14 \times Rx\_add + 0.84$ $\overline{N} \geq -0.08 \times Rx\_add + 0.64$ $\overline{\Delta d} \leq 0.2$ $\overline{\Delta n} \leq 0.2$ wherein the front surface, or object side surface, of the lens is a zone multifocal surface or a continuous aspheric multifocal surface and the back surface, or eye side surface, of the lens is an aspheric surface. By "zone multifocal surface" is meant that there is a discontinuity as one moves from one power zone to another power zone. The aspheric back surface preferably has a radius of approximately 7.20 to 8.10 mm and more preferably 7.85 mm, from the geometric center to the lens edge and a conic constant of −0.26.

In a still more preferred embodiment, the front multifocal surface has five, radially symmetric zones that alternate between near correction and distance correction or near, distance and intermediate correction and an aspheric back surface with a radius of approximately 7.20 to 8.10 mm and more preferably 7.85 mm, and a conic constant of −0.26. In Table 2 below provides more preferred values for the set of three lenses, A, B, and C within this embodiment.

TABLE 2

|  | A | B | C |
|---|---|---|---|
| Nominal Zone Height (diopters) | 0.6 | 0.9 | 1.9 |
| Zone Height Range | 0.3 to 0.8 | 0.7 to 1.2 | 1.7 to 2.1 |
| Spherical Aberration (diopters/mm²) | −0.1 | −0.17 | −0.1 |

TABLE 2-continued

|  | A | B | C |
|---|---|---|---|
| Spherical Aberration Range | −0.08 to −0.12 | −0.14 to −0.20 | −0.8 to −0.12 |
| Zone Transitions-1$^{st}$ | 0.75 | 0.7 | 1 |
| Zone Transitions-1$^{st}$ Range | 0.65 to 0.85 | 0.6 to 0.8 | 0.9 to 1.1 |
| Zone Transitions-2d | 1.25 | 1.3 | 1.95 |
| Zone Transitions-2d Range | 1.15 to 1.35 | 1.2 to 1.4 | 1.85 to 2.05 |
| Zone Transitions-3$^{rd}$ | 2 | 1.95 | 2.5 |
| Zone Transitions-3$^{rd}$ Range | 1.9 to 2.1 | 1.85 to 2.05 | 2.4 to 2.6 |
| Zone Transitions-4$^{th}$ | 2.5 | 2.55 | 3.45 |
| Zone Transitions-4$^{th}$ Range | 2.4 to 2.6 | 2.45 to 2.65 | 3.35 to 2.55 |

In a yet more preferred embodiment, the invention provides a set of three lenses, each lens having a power profile different from that of each of the other lenses and the lenses satisfying the following relationships:

$$\overline{D} \geq -0.14 \times Rx\_add + 0.84$$

$$\overline{N} \geq -0.08 \times Rx\_add + 0.64$$

$$\overline{\Delta}d \leq 0.2$$

$$\overline{\Delta}n \leq 0.2$$

wherein the front surface is a zone multifocal surface in which in each zone is incorporated spherical aberration in which spherical aberration of the near zones may be an additional 0.05 to 0.1 diopters/mm$^2$ from that of the distance zones. Alternatively, whether the multifocal surface is a continuous or discontinuous surface, the spherical aberration for distance and near may be adjusted according to the following equations:

$$SA_{RX} = SA_0 + c \cdot Rx\_sphere$$

$$0.0044 < c < 0.0052$$

wherein $SA_0$ is the spherical aberration of the design for an Rx_sphere that equals 0.0 diopters;

c is a constant of a value between 0.0044 and 0.0052 and preferably is 0.0048. The back surface of the lens in these embodiments is preferably aspheric with a radius of approximately 7.20 to 8.10 mm, more preferably 7.85 mm and a conic constant of −0.26.

In yet another embodiment of the invention, a set of three lenses is provided, each lens having a power profile different from that of each of the other lenses and the lenses satisfying the following relationships:

$$\overline{D} \geq -0.14 \times Rx\_add + 0.84$$

$$\overline{N} \geq -0.08 \times Rx\_add + 0.64$$

$$\overline{\Delta}d \leq 0.2$$

$$\overline{\Delta}n \leq 0.2$$

$$STD(P_E(r)) < 0.15 \text{ for } 1.25 < r < 3.$$

wherein STD is the standard deviation; and $P_E(r)$ is the effective lens plus-eye power given by the following equation:

$$P_E(R) = \int_0^R P(r) \cdot r \, dr \quad \text{(VII)}$$

wherein P(r) is the power of the contact lens on the eye given by Equation II. The additional constraint desensitizes the visual performance of the design to the pupil size.

In the zone designs of the invention, the first zone, or the zone that is centered at the geometric center of the lens may be, and preferably is, a zone that provides distance vision correction or it may provide near or intermediate vision correction. In lens pairs, the first zone may be the same or different. Similarly, in continuous, aspheric multifocal designs, the correction at the center of each of the lens pairs may be the same or different and may be selected from distance, intermediate and near correction.

Contact lenses that may be designed according to the invention preferably are soft contact lenses. Soft contact lenses, made of any material suitable for producing such lenses, preferably are used. Illustrative materials for formation of soft contact lenses include, without limitation silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

A preferred lens-forming material is a poly 2-hydroxyethyl methacrylate polymers, meaning, having a peak molecular weight between about 25,000 and about 80,000 and a polydispersity of less than about 1.5 to less than about 3.5 respectively and covalently bonded thereon, at least one cross-linkable functional group. This material is described in U.S. Pat. No. 6,846,892 incorporated herein in its entirety by reference. Suitable materials for forming intraocular lenses include, without limitation, polymethyl methacrylate, hydroxyethyl methacrylate, inert clear plastics, silicone-based polymers, and the like and combinations thereof.

Curing of the lens forming material may be carried out by any means known including, without limitation, thermal, irradiation, chemical, electromagnetic radiation curing and the like and combinations thereof. Preferably, the lens is molded which is carried out using ultraviolet light or using the full spectrum of visible light. More specifically, the precise conditions suitable for curing the lens material will depend on the material selected and the lens to be formed. Polymerization processes for ophthalmic lenses including, without limitation, contact lenses are well known. Suitable processes are disclosed in U.S. Pat. No. 5,540,410 incorporated herein in its entirety by reference.

What is claimed is:

1. An ophthalmic lens pair, comprising a first lens for a dominant eye and a second lens for a non-dominant eye of an individual, said lens pair providing distance and near vision correction and satisfying the following relationships:

$$\overline{D} \geq -0.14 \times Rx\_add + 0.84$$

$$\overline{N} \geq -0.08 \times Rx\_add + 0.64$$

$$\overline{\Delta}d \leq 0.2$$

$\overline{\Delta n} \leq 0.2$ wherein $\overline{D}$ is a mean value of a binocular weighted distance ratio for pupil diameters of about 2.5 to 6 mm;

Rx_add is an additional power in diopters added to a distance prescription to provide near vision correction for an individual;

$\overline{N}$ is a mean value of a binocular weighted near ratio for pupil diameters of about 2.5 to 6 mm;

$\overline{\Delta d}$ is a mean value for a disparity at distance vision between the first and second lens for pupil diameters of about 2.5 to 6 mm; and $\overline{\Delta n}$ is a mean value for a disparity at near vision between the first and second lens for pupil diameters of about 3.5 to about 6 mm.

2. The lens pair of claim 1, wherein the pair is elected from a set of lenses having a range of add powers from about 0.75 to about 2.50 diopters and range of distance powers from about −12.00 to about +8.00 diopters.

3. The lens pair of claim 1, wherein at least one lens of the lens pair further comprises a front surface that is a zone multifocal surface and a back surface is an aspheric surface.

4. The lens pair of claim 3, wherein the front multifocal surface is a zone multifocal surface comprising at least five, radially symmetric zones alternating between near vision and distance vision correction zones and the back surface is an aspheric surface.

5. The lens pair of claim 4, wherein the back surface is of a radius of about 7.85 mm and a conic constant of −0.26.

6. The lens pair of claim 1, wherein in at least one lens of the lens pair comprises a front surface that is a zone multifocal surface with alternating distance correction and near correction zones, wherein into each near correction zone is incorporated a spherical aberration that is biased about 0.5 to about 0.1 diopters/mm² from that of the distance correction zones.

7. The lens pair of claim 1, wherein in at least one lens of the lens pair comprises a front surface that is a zone multifocal surface with alternating distance correction and near correction zones, wherein a spherical aberration is adjusted across the distance correction zones according to the following equations:

$SA_{RX} = SA_0 + c*Rx\_sphere$ $0.0044 < c < 0.0052$ wherein $SA_0$ is the spherical aberration of the design for an Rx_sphere that equals 0.0 diopters; and c is a constant of a value between 0.0044 and 0.0052.

8. The lens pair of claims 6 or 7, wherein in at least one lens of the lens pair a back surface of the lens is an aspheric surface.

9. The lens pair of claim 1, wherein the lens pair further satisfies the relationship:

$STD(P_E(r)) < 0.15$ for $1.25 < r < 3$, wherein STD is a standard deviation.

10. A method for correcting presbyopia, comprising the steps of: a.) providing two or more ophthalmic lenses, each lens having a power profile different from that of each of the other lenses; and b.) selecting from the lenses provided in step a.) a first lens and a second lens to form a lens pair, a first lens of the lens pair being for a dominant eye and a second lens of the lens pair being for a non-dominant eye of an individual, said lens pair providing distance and near vision correction and wherein the first and second lens pair satisfy the following relationships:

$\overline{D} \geq -0.14 \times Rx\_add + 0.84$ $\overline{N} \geq -0.08 \times Rx\_add + 0.64$ $\overline{\Delta d} \leq 0.2$ $\overline{\Delta n} \leq 0.2$ wherein $\overline{D}$ is a mean value of a binocular weighted distance ratio for pupil diameters of about 2.5 to 6 mm;

Rx_add is an additional power in diopters added to a distance prescription to provide near vision correction for an individual;

$\overline{N}$ is a mean value of a binocular weighted near ratio for pupil diameters of about 2.5 to 6 mm;

$\overline{\Delta d}$ is a mean value for a disparity at distance vision between the first and second lens for pupil diameters of about 2.5 to 6 mm; and $\overline{\Delta n}$ is a mean value for a disparity at near vision between the first and second lens for pupil diameters of about 3.5 to about 6 mm.

* * * * *